United States Patent [19]
Devenyi

[11] Patent Number: 5,410,436
[45] Date of Patent: Apr. 25, 1995

[54] APPARATUS FOR PROVIDING THE COORDINATED ROTATION OF TWO INTERRELATED OPTICAL COMPONENTS

[75] Inventor: Gabor Devenyi, West Penetang, Canada

[73] Assignee: Hughes Aircraft Company, Los Angeles, Calif.

[21] Appl. No.: 46,055

[22] Filed: Apr. 12, 1993

[51] Int. Cl.⁶ ............................................. G02B 7/06
[52] U.S. Cl. .................... 359/412; 359/407; 359/411; 359/414; 359/417
[58] Field of Search ............... 359/407, 411, 412, 413, 359/414, 415, 416, 417

[56] References Cited

U.S. PATENT DOCUMENTS

| | | | |
|---|---|---|---|
| 956,182 | 4/1910 | Schachenmayr | 359/415 |
| 1,965,755 | 7/1934 | Warmisham | 359/600 |
| 4,272,153 | 6/1981 | Beecher | 350/36 |
| 4,545,656 | 10/1985 | Takano | 359/417 |
| 4,605,288 | 8/1986 | Shimofutura | 359/414 |

FOREIGN PATENT DOCUMENTS

| | | | |
|---|---|---|---|
| 4004248 | 8/1990 | Germany | 359/411 |
| 61-116311 | 6/1986 | Japan | 359/416 |
| 622466 | 6/1949 | United Kingdom | |

Primary Examiner—Joseph A. Popek
Assistant Examiner—Tan Nguyen
Attorney, Agent, or Firm—Michael W. Sales; Wanda K. Denson-Low

[57] ABSTRACT

An apparatus (10) for providing the coordinated rotation of two interrelated components (12, 14) includes first and second cam segment lobes (20, 22) each respectively associated with the interrelated components (12 14), the cam segment lobes (20, 22) are urged into rotatable contact with each other such that when the components (12, 14) are subjected to a torque the lateral distance therebetween is changed.

14 Claims, 2 Drawing Sheets

APPARATUS FOR PROVIDING THE COORDINATED ROTATION OF TWO INTERRELATED OPTICAL COMPONENTS

BACKGROUND OF THE INVENTION

The present invention generally relates to an apparatus for providing the coordinated rotation of two interrelated components and, in particular, relates to one such apparatus having first and second cam segment lobes each respectively associated with first and second devices and including means for urging the first and second cam segment lobes into rotatable contact with each other.

There are many instances where it is desirable to control the coordinated rotation of two interrelated components. One of the more common instances is the adjustment of the interocular distance between two eyepieces, such as the eyepieces used in microscopes, binoculars and other optical devices. Although the detailed description of this invention will be directed to an optical device embodiment, it will be apparent to those skilled in the mechanical arts that the present invention is not, in fact, so limited.

Conventional interocular distance adjustment mechanisms include such arrangements as interocular gear systems and fork and pin drives. In general, gear systems are expensive and can be quite complex if little of no play is acceptable. Further, in such play-free arrangements the movement is usually ergonomically rough due, primarily, to the high frictional load placed on the beatings of such a system. Typical fork and pin drive mechanisms not only exhibit noticeable play but also a changing rate of interocular rotation along with excessive friction at the pin/fork interface.

Although the interocular gear system and the pin and drive arrangements are acceptable in many applications they are frequently unacceptable in applications where precise, smooth, play-free adjustment of the interocular distance of two eyepieces is required. For example, there is an every increasing use of microscopic instruments in the field of medical examination and surgery. In such circumstances, the use of interocular gear systems or fork and pin drives is, for the deficiencies cited above, quite unacceptable to the user.

Hence, it is highly desirable to provide an interocular distance adjustment apparatus that is inexpensive, precise, play-free and comfortable to use.

SUMMARY OF THE INVENTION

Accordingly, it is one object of the present invention to provide an apparatus for providing the coordinated rotation of two interrelated components that substantially overcomes the drawbacks of conventional systems.

This object is accomplished, at least in part, by an apparatus having first and second components having first and second cam segment lobes respectively associated therewith and means for urging the first ;and second cam segment lobes in rotatable contact with each other.

Other objects and advantages will become apparent to those skilled in the art from the following detailed description of the invention read in conjunction with the appended claims and the drawings attached hereto.

BRIEF DESCRIPTION OF THE DRAWINGS

The drawings, not drawn to scale, include.

DETAILED DESCRIPTION OF THE INVENTION

Figure 1:
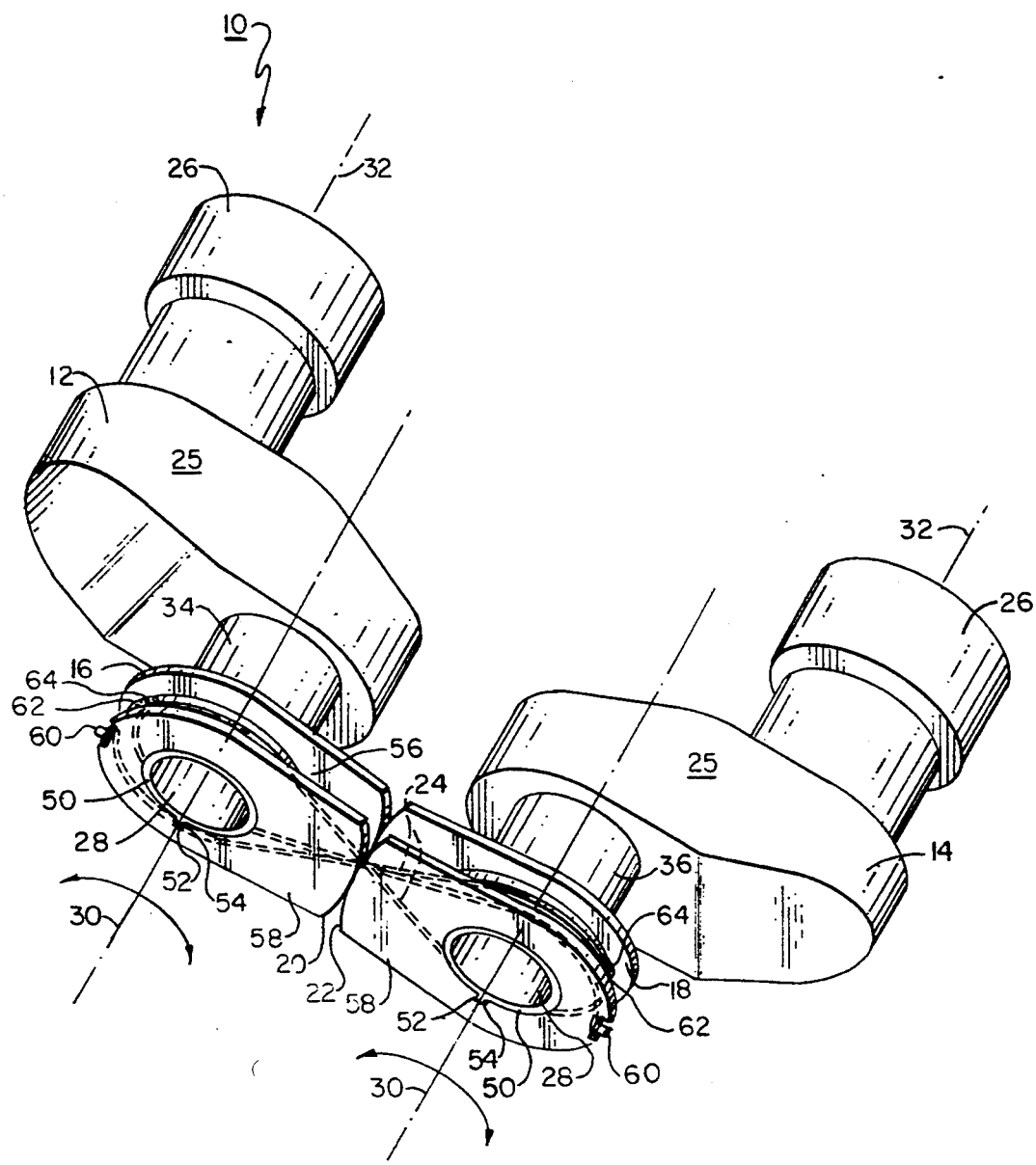
FIG. 1 which is a perspective view of an interocular distance adjustment apparatus embodying the principles of the present invention.
Figure 2:
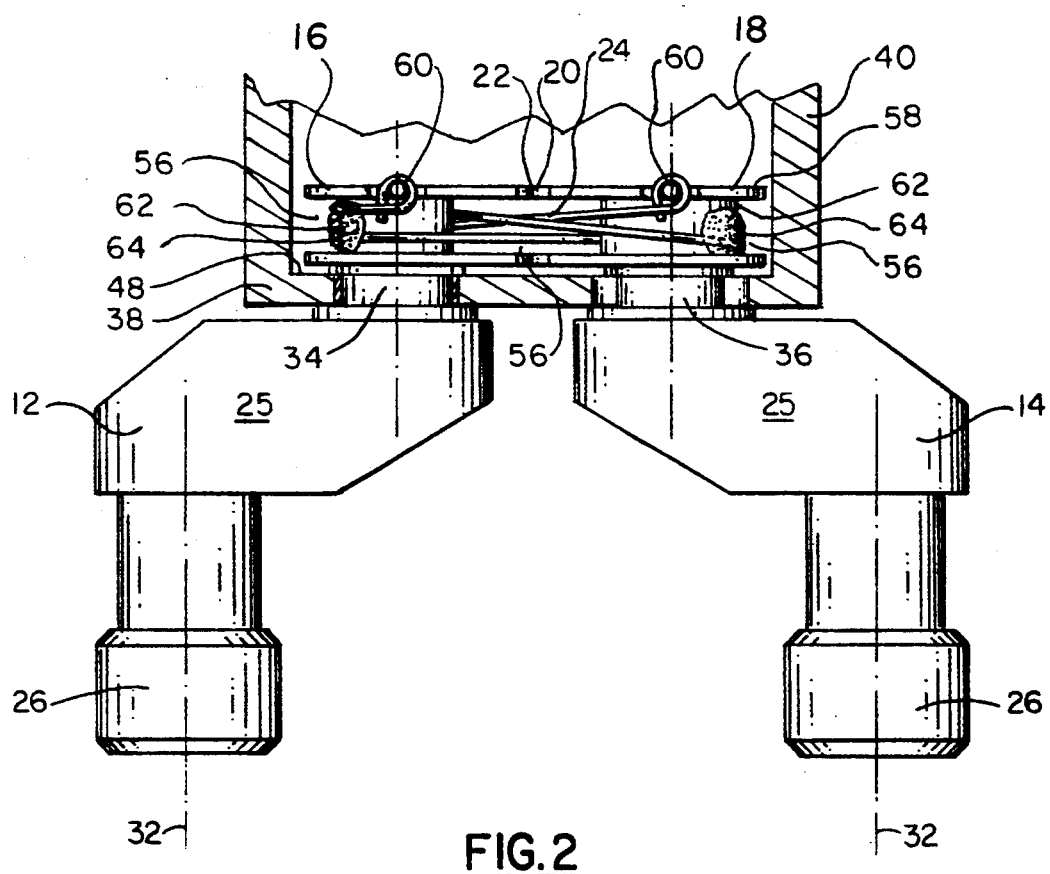
FIG. 2 which is side view of the interocular distance adjustment apparatus shown in FIG. 1.

An apparatus, generally indicated at 10 in the drawings and embodying the principles of the present invention, for providing the coordinated rotation of two interrelated components, 12 and. 14, respectively, includes first and second cam segments, 16 and 18, respectively, each having a cam segment lobe, 20 and 22, respectively, associated therewith, and means 24 for urging the cam segment lobes, 20 and 22, into contact with each other such that when a torque is applied to either one or both of the components, 12 and 14, the lateral distance between the components, 12 and 14, is changed.

In the embodiment shown, the apparatus 10 is an optical apparatus wherein the first and second components, 12 and 14, respectively, are eyepieces. Each eyepiece includes a body 25 having a viewing end 26 and a light receiving end 28. In such an embodiment, the eyepieces include a plurality of optical elements, not shown in the drawings, for directing light received at the light receiving end 28 to the viewing end 26. Consequently, the light receiving end 28 has an optical axis 30 associated therewith and the viewing end 26 has an optical axis 32 associated therewith. Typically, as shown, the optical axis 30 the light viewing end 28 of each component, 12 and 14, is substantially parallel with and offset from the optical axis 32 of the viewing end 26. In one particular embodiment, each of the components, 12; and 14, includes a cylindrical shaft, 34 and 36, respectively, extending from the body 25 at the light receiving end 28 thereof.

Figure 3:
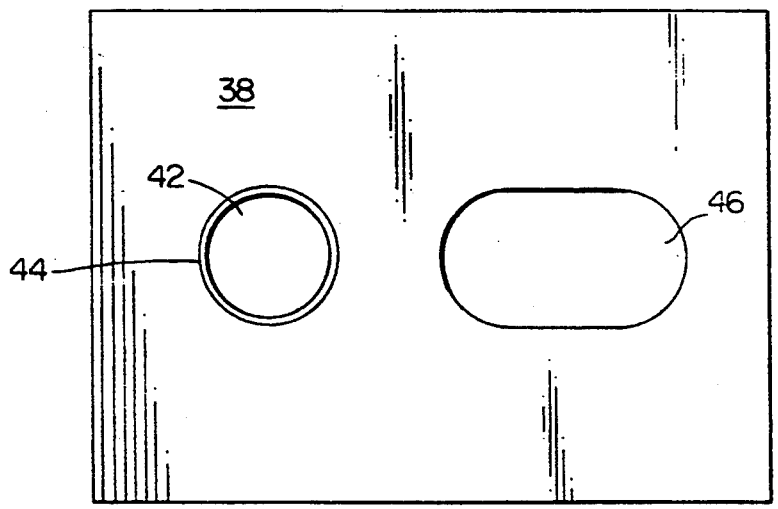
FIG. 3 which is a wall portion of a housing particularly useful in conjunction with the apparatus shown in FIG. 1.

In this embodiment, the shafts, 34 and 36, extend through a wall 38 of a housing 40. Preferably, one of the shafts, for example, shaft 34, is fixedly mounted through a first opening 42, as shown in FIG. 3, in the wall 38 by means of a bearing 44 that allows only rotational movement of the shaft 34. The other shaft 36 extends through an elongated opening 46, as shown in FIG. 3, through the wall 38 that allows both rotational movement of the shaft 36 as well as movement lateral with respect to the shaft 34. Preferably, in such an embodiment, the eyepieces are secured to the housing 40 by securing the first and second cam segments, 16 and 18, respectively, to the first and second shafts, 34 and 36, respectively, on the side 48 of the wall 38 opposite the respective viewing ends 26.

In one preferred embodiment, each cam segment, 16 and 18, includes a shaft opening 50 sized to receive therethrough one of the shafts, 34 or 36. Each cam segment, 16 and 18, also includes one of the cam segment lobes, 20 and 22, respectively. Typically, in the preferred embodiment, each cam segment lobe, 20 and 22, defines an arc segment of a circle that is concentric with the shaft opening 50 of the respective cam segments, 16 and 18. Preferably, each of the cam segment lobes, 20 and 22, subtend between 20 degrees and 50 degrees of arc. In the embodiment shown, each cam segment, 16 and 18, is provided with at least one slot 52 extending into the cam segment, 16 and 18, from the periphery of the shaft opening 50. Each shaft, 34 and 36, is provided with keys 54 sized to extend into the corresponding slots 52. The keys 54 and slots 52 are disposed such that when the cam segments, 16 and 18, are fitted onto the shafts, 34 and 36, respectively, the first and second cam segment lobes, 20 and 22, respectively, face each other. Preferably, the keys 54 and slots 52 are disposed so that the point of contact of the cam segment lobes, 20 and 22, lies along a line connecting the optical axes 30 of the light receiving ends 28 of the components, 12 and 14. The cam segments, 16 and 18, can be secured to the cylindrical shafts, 34 and 36, respectively, by any means known in the art, including frictional fitting, epoxying, or the like.

Preferably, each cam segment, 16 and 18, includes a peripheral groove 56 that is concentric with the shaft opening 50 such that a substantial amount of each cam segment lobe, 20 and 22, is grooved. The periphery 58 of each cam segment, 16 and 18, is machined to provide an anchor pin 60. Preferably, the anchor pins 60 are formed distal each other.

In the preferred embodiment, the means 24 for urging the cam segment lobes, 20 and 22, into contact with each other includes a preloaded spring wire that is wrapped around the cam segments, 16 and 18, in the grooves 56 thereof. It has been found that one and a half figure eight windings work quite effectively although other winding configurations can also be implemented. In such embodiment, the spring wire is wrapped around the anchor pins 60 to secure the wire in place and to maintain the tension thereon. In order to further ensure that the wire maintains a constant tension, epoxy 64 can be applied to the distal portions 62, of the cam segments, 16 and 18, subsequent to the winding and anchoring of the wire.

In one particular embodiment, the grooves 56 are about 0.028 inches wide and the spring wire is 0.008 inches in diameter. The diameter of the first opening 42, the width of the elongated opening 46 and the outside diameter of the cylindrical shafts, 34 and 36, are cooperatively sized so that the cylindrical shaft 36 moves smoothly in a lateral direction within the elongated opening 46. The spring wire is wound about the shafts, 34 and 36, to a tightness that allows both smooth movement and play-free adjustment.

Hence, it will be understood that the apparatus 10 provides smooth, play-free and relatively inexpensive coordinated rotation between the component, 12 and 14.

Although the present invention has been described herein with respect to one or more particular embodiments, k will be understood that other arrangement and configurations may also be made without departing from the spirit and scope hereof. Hence, the present invention is deemed limited only by the appended claims and the reasonable interpretation thereof.

What is claimed is:

1. Apparatus for changing a distance between two optical components comprising:
    a housing member;
    means for rotatably securing a first one of said two components in a first opening in said housing member;
    means for slidably disposing a second one of said two components in a second opening in said housing member;
    first and second cam segments, said first cam segment being disposed on said first component and having a first cam segment lobe and a first peripheral groove in said first cam segment lobe, said second cam segment being disposed on said second component and having a second cam segment lobe and a second peripheral groove in said second cam segment lobe, said first and second cam segment lobes contacting each other; and
    means disposed in said first and second grooves for urging said first and second cam segment into contact with each other.

2. The apparatus as claimed in claim 1, wherein each said first and second peripheral groove extends substantially completely through said first and second cam segment lobe respectively.

3. The apparatus as claimed in claim 2 wherein said urging means includes a spring wire wrapped around said cam segments in said grooves.

4. The apparatus as claimed in claim 3, wherein said wire is wrapped around said cam segments in a figure-eight.

5. The apparatus as claimed in claim 4 wherein said wire includes one and a half figure-eight turns.

6. The apparatus as claimed in claim 3 wherein each said cam segment includes an anchor pin at the periphery thereof and the ends of said wire are secured to said anchor pins.

7. The apparatus as claimed in claim 6 wherein said wire is epoxied into said groove of each said cam segment.

8. The apparatus as claimed in claim 1 wherein each said cam segment lobe subtends an arc of between about 20 degrees and 50 degrees.

9. Apparatus for adjusting a distance between first and second optical components comprising:
    first and second cam segments; connected to said first and second components respectively and having first and second cam segment lobes; and
    a spring wire member disposed around said first and second cam segments lobes for urging said first and second cam segment lobes into contact with each other to adjust the distance between the optical components when a torque is applied to either component.

10. The apparatus of claim 9, said cam segments lobes each including a groove, said spring wire disposed in to said grooves.

11. An adjustable eyepiece comprising;
    first and second optical components;
    first and second cam segments connected to said first and second components respectively and having first and second cam segment lobes; and
    means connected to said cam segment lobes for urging said first and second cam segments into contact with each other to adjust a distance between the first and second components when a torque is applied to either of said components.

12. The adjustable eyepiece of claim 11 further comprising:
    a housing member having a first and second opening;
    means for rotatably securing said first optical component in said first opening; and
    means for slidably securing said second component in said second opening.

13. The adjustable eyepiece of claim 11 wherein said urging means is a spring wire.

14. The adjustable eyepiece of claim 11, said cam segment lobes having first and second peripheral grooves, said urging means disposed in said grooves.

* * * * *